(12) United States Patent
Chandramouli et al.

(10) Patent No.: US 10,536,893 B2
(45) Date of Patent: Jan. 14, 2020

(54) ACCESS AGNOSTIC CONTROL PLANE

(71) Applicant: NOKIA SOLUTIONS AND NETWORKS OY, Espoo (FI)

(72) Inventors: Devaki Chandramouli, Plano, TX (US); Rainer Liebhart, Munich (DE); Maximilian Riegel, Nürnberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/764,043

(22) PCT Filed: Sep. 27, 2016

(86) PCT No.: PCT/EP2016/072963
§ 371 (c)(1),
(2) Date: Mar. 28, 2018

(87) PCT Pub. No.: WO2017/055267
PCT Pub. Date: Apr. 6, 2017

(65) Prior Publication Data
US 2018/0359675 A1 Dec. 13, 2018

Related U.S. Application Data

(60) Provisional application No. 62/234,311, filed on Sep. 29, 2015.

(51) Int. Cl.
*H04W 80/02* (2009.01)
*H04W 40/02* (2009.01)
(Continued)

(52) U.S. Cl.
CPC ........... *H04W 40/02* (2013.01); *H04W 28/20* (2013.01); *H04W 76/27* (2018.02); *H04W 80/02* (2013.01); *H04W 80/08* (2013.01)

(58) Field of Classification Search
CPC ..... H04W 40/02; H04W 76/27; H04W 28/20; H04W 80/02; H04W 80/08
See application file for complete search history.

(56) References Cited

U.S. PATENT DOCUMENTS

| 7,006,472 | B1 * | 2/2006 | Immonen | H04L 29/12009 |
| | | | | 370/332 |
| 2009/0046631 | A1 * | 2/2009 | Meylan | H04W 80/02 |
| | | | | 370/328 |

(Continued)

FOREIGN PATENT DOCUMENTS

WO 2014/163372 A1 10/2014

OTHER PUBLICATIONS

International Search Report & Written Opinion dated Dec. 23, 2016 corresponding to International Patent Application No. PCT/EP2016/072963.

(Continued)

*Primary Examiner* — Mohamed A Kamara
(74) *Attorney, Agent, or Firm* — Squire Patton Boggs (US) LLP (57) ABSTRACT

A method of control plane messaging between a user equipment and a network element in a core network in which Non-Access Stratum protocol layer messages are sent in a Non-Access Stratum protocol layer wherein an Ethernet convergence sublayer is provided between the Non-Access Stratum protocol layer and a radio protocol layer. Systems, apparatuses, and computer program products for control plane messaging are also provided.

17 Claims, 6 Drawing Sheets

(51) Int. Cl.
*H04W 76/27* (2018.01)
*H04W 28/20* (2009.01)
*H04W 80/08* (2009.01)

(56) References Cited

U.S. PATENT DOCUMENTS

2009/0103445 A1* 4/2009 Sammour ............. H04L 1/1812
370/252
2011/0044218 A1 2/2011 Kaur et al.
2016/0057795 A1* 2/2016 Kim ...................... H04W 76/14
370/329
2016/0198379 A1* 7/2016 Cho ....................... H04W 36/14
455/436

OTHER PUBLICATIONS

Nokia: "Nokia Vision & Priorities for Next Generation Radio Technology," 3GPP Draft; RWS-150010, vol. TSG RAN, Phoenix, Arizona, Sep. 17-18, 2015.
Nokia Networks, "Study for a Next Generation Network Architecture," 3GPP Draft; SP-150554 revision of SP-150481, 3GPP TSG SA-Meeting #69, Phoenix, Arizona, Sep. 15-27, 2015.
European Office Action issued in corresponding European Patent Application No. 16 774 651.0-1213 dated Sep. 30, 2019.

* cited by examiner

ACCESS AGNOSTIC CONTROL PLANE

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to control plane messaging.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

5G is the new generation of radio systems and network architecture delivering extreme broadband and ultra-robust, low latency connectivity and massive networking for the Internet of Things (IoT) to enable the programmable world, which can transform individual lives, the economy and society as a whole.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for control plane messaging, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, 5G is the next generation of radio systems and network architecture for delivering extreme broadband and ultra-robust, low latency connectivity and massive networking for various applications, such as the Internet of Things (IoT). 5G may be particularly applicable in the following three use case categories:

1. Massive broadband that delivers gigabytes of bandwidth on demand;
2. Critical machine-type communication that allows for the immediate, synchronous eye-hand feedback that enables remote control over robots;
3. Massive machine-type communication that connects billions of sensors and machines.

The biggest difference between 4G and 5G design requirements is the diversity of use-cases that 5G networks must support as compared to 4G networks that were primarily designed for the single use-case of delivering high speed mobile broadband.

5G will not only be a 'new radio access technology (RAT) family' but its architecture will expand to multiple dimensions by providing a common core for multiple radio technologies (cellular, Wi-Fi, fixed), multiple service (IoT, mobile broadband, low latency-high reliability) and multiple network and service operators.

The new 5G architecture requires an "access agnostic" core, where the 5G core can independently evolve from the connected radio technologies like 5G radio and Wi-Fi. This is one key requirement that operators are strongly interested in order to enable independent evolution of access and core.

Next generation mobile networks (NGMN) white paper has a requirement to introduce access agnostic core. This is also reflected in the 4G Americas (4GA) white paper which states: "5G networks must also support multi-RAT connectivity efficiently and effectively," and "Provide access agnostic packet core across multiple Radio Technologies."

Figure 1:
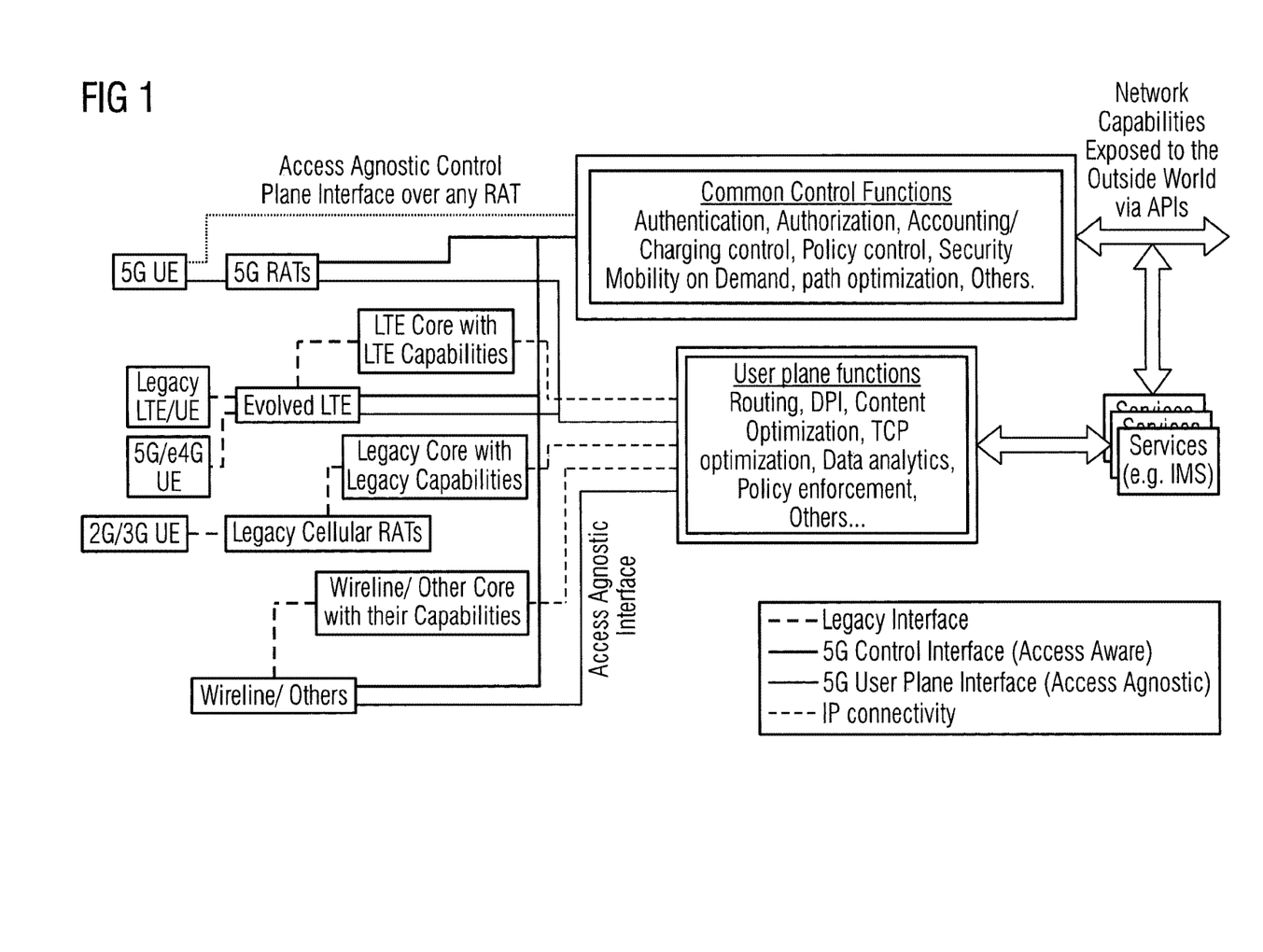
FIG. 1 illustrates an example system architecture, according to an embodiment.

Further, 4GA white paper also requires access agnostic control plane interface over any RAT. FIG. 1 illustrates an example of the proposed architecture from 4GA white paper.

The access agnostic core is also reflected in the objective for the study item proposed for a 5G architecture to SA plenary (SP-150554), which states: "Allow independent evolution of core and radio networks or different radio networks."

One important aspect of making the core independent of the used radio technology is to decouple the Non-Access Stratum (NAS) protocol from the underlying radio protocol as NAS is a protocol running directly between the UE and the core network (MSM (mobility and session management), MME (mobility management entity)) and is used for mobility and session management purposes. NAS is a protocol running directly between the UE and the core network (MSM, MME) and is used for mobility and session management purposes.

In 2G, 3G, and 4G networks, the NAS protocol is carried over Radio Resource Control (RRC) messages and this makes the NAS protocol access dependent as RRC depends on the underlying radio technology. Thus, adopting this model directly for 5G would go against the access agnostic approach mentioned above.

It has been proposed to introduce NAS over IP as a transport (like WLCP protocol introduced in 3GPP Release 12). This can be access agnostic, however the following aspects are not fully clear with this proposal: In case of a 5G UE accessing the 5G core via 5G radio, it is unclear how IP connectivity would be setup before the 5G UE is registered with the 5G core network, where authentication and authorization functions reside. Furthermore, expecting the IP connection to be setup for transporting control plane NAS messages is like a "chicken and egg" problem. A main objective for NAS protocol is to support mobility and session management (thus help establishment of IP connectivity). If the IP connection can be established without NAS, then there is no reason to use NAS.

An embodiment of the invention provides a feasible approach for control plane (e.g., NAS) messaging so that NAS is usable over any access. This approach will also help reduce the dependency of packet core from the used radio technology (e.g., 5G radio or Wi-Fi).

In the 5G architecture, it is assumed that control (NAS) protocol runs between UE and core network as shown in the architecture illustrated in FIG. 1 discussed above. An embodiment introduces NAS over Ethernet (referred to as NASoETH) to address the requirement that NAS can run over any radio access supported by a 5G architecture or potentially other suitable architectures. A convergence sublayer is provided which may provide a capability to encapsulate protocol data units of a higher layer in the service data units of a lower layer. The convergence layer may comprise a protocol identifier to allow distinction of an upper layer protocol carried in a service data unit of a lower layer protocol. In addition to the protocol identifier, it may also cover functions for mapping addresses or filtering rules for mapping QoS classes. In this embodiment the convergence sublayer is between packet transport over radio and Ethernet to create an end-to-end Ethernet layer and make NASoETH unaware of the underlying radio protocol stack. Ethernet is connectionless and widely implemented in many devices like Smartphones, Tablets, Laptops, PCs. Thus, certain embodiments introduce Ethernet as a convergence sublayer between NAS and the radio specific protocol stack (especially on UE and 5GAP—5G Access Point). (5GAP is a 5G access point.) This implies that Ethernet framing is used to transport NAS messages between UE and core network. Another option could be to introduce a generic convergence layer below NAS. This convergence sub layer can reside either above RRC in case of cellular network or above MAC in case of Wi-Fi access. Generic convergence layer could be IP, ETH or something else.

According to certain embodiments, it is assumed that the 5G packet data convergence protocol (PDCP) layer supports the functionality of an Ethernet Convergence Sublayer (ETH-CS) to carry Ethernet frames as defined by IEEE 802). ETH-CS is a convergence function in the UE to enable transport of Ethernet frames to/from the network. Supporting ETH-CS as a dedicated convergence layer at the UE helps to introduce it also for legacy systems, such as LTE. Alternatively, a generic convergence layer can be introduced in the UE to help introduce it on top of RRC in LTE and 5G and on top of MAC in case of Wi-Fi. Generic convergence layer could be IP, ETH or something else.

For example, according to one embodiment, a 5G UE may send a NAS message, such as an Attach Request message, to the controller independent of the access as the Attach Request is encapsulated in an ETH frame, either natively (e.g. in case of 802.3 and 802.11) or by the ETH-CS (e.g., in case of 5G or LTE).

According to another embodiment, if the UE is monitoring 5G cell Tracking Areas (TAs), and needs to send a Tracking Area Update (TAU) to the 5G controller, a multiply connected UE could send it via Wi-Fi access, if that is available and requires less transmission power, or can send it simultaneously over 5G and Wi-Fi to increase the reliability of message transfer. It is noted that UEs in the market generally support Ethernet for Wi-Fi access.

According to an embodiment, in order for an access point or base station (e.g., 5GAP or eNB) to forward the initial NAS message in an ETH frame from the UE to MSM (or MME), the MSM (or MME) may be assigned an ETH multicast address that the UE can use to send the message. In this embodiment, the UE may send the NAS message to this multicast or a broadcast address in the network. The UE may also include its MAC address in the first NAS message (as ETH source address). The access point/base station may then select the appropriate MSM (or MME) by using a selection algorithm (e.g., based on load, supported features, origin of the UE, device type, applications running in the UE, etc.) and forward the first NAS message (assumes support for a simple relay in the 5GAP) to the MSM (or MME). Thus, in this example, the access point/base station need not consider the ETH addresses for forwarding of frames but forwards transparently ETH frames on a given point-to-point link to the MSM (or MME). In the response from the MSM (or MME) to the UE, the MSM (or MME) may include its own MAC address as source address in the ETH frame.

Another embodiment may include bridging of ETH frames in the access point/base station (e.g., 5GAP). In this example embodiment, the access point/base station can also act as an Ethernet bridge/relay/forwarding function. Thus, the access point/base station does not need to consider other identifiers for forwarding but bridges ETH frames according to the bridging specifications for Ethernet with standard protocols and all the self-organizing benefits which Ethernet provides apply in this case. This can enable support for additional functionalities at the Ethernet layer.

Figure 2A:
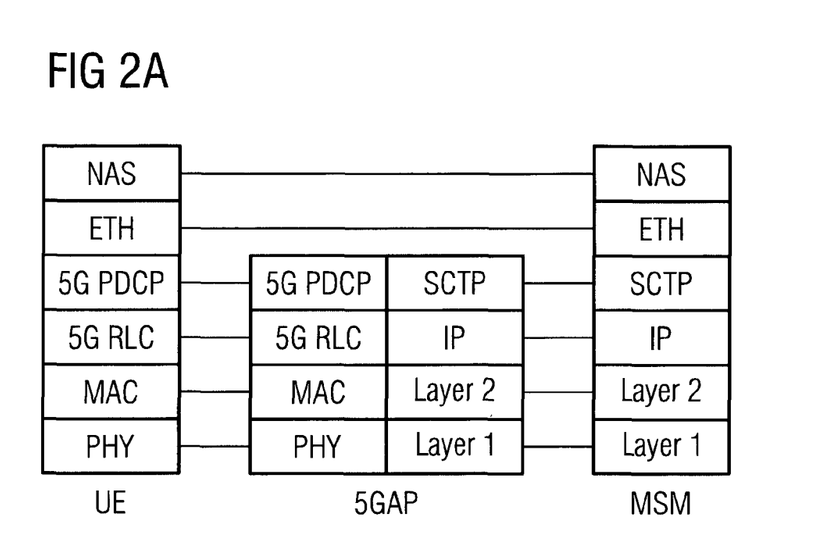
FIG. 2a illustrates an example protocol stack, according to one embodiment.
Figure 2B:
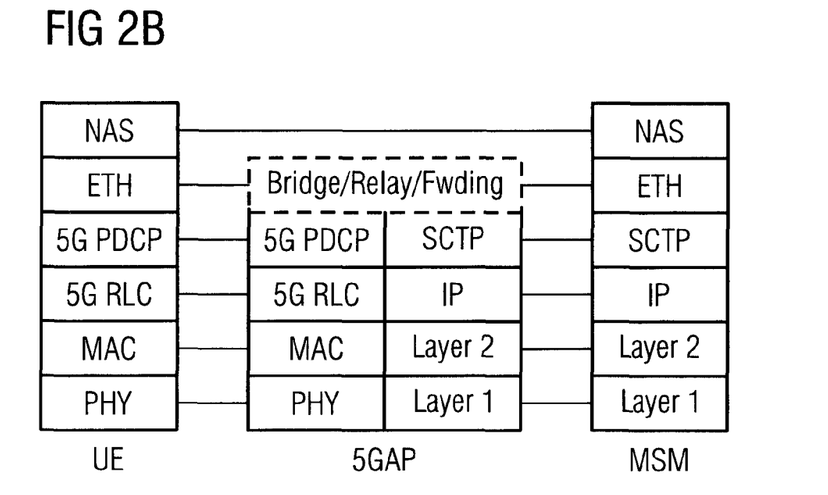
FIG. 2b illustrates an example protocol stack, according to another embodiment.

FIG. 2a illustrates an example protocol stack for NAS over ETH in a 5G network, according to one embodiment. In FIG. 2a NAS protocol data units (higher layer) are encapsulated into Ethernet frames (convergence layer) and are sent as service data units in PDCP (packet data convergence protocol) layer (lower layer). Ethernet frames are carried as service data units in PDCP as well as SCTP (stream control transmission protocol) assuming that there is p2p (peer to peer) forwarding in 5GAP. The convergence layer may be a shim on top of SCTP and 5G PDCP to enable encapsulation of Ethernet frames in PDCP and SCTP. FIG. 2b illustrates an example protocol stack for NAS over ETH in a 5G network, according to another embodiment in which the access point/base station includes bridge/relay/forwarding function. In FIG. 2b NAS protocol data units (higher layer) are encapsulated into Ethernet frames (convergence layer) and are sent as service data units in PDCP layer (lower layer). In the case that bridge/relay/forwarding is used, the enables multiplexing NAS messages of multiple user equipments on a common SCTP connection between 5GAP and MSM. The convergence layer may be a shim on top of SCTP and PDCP to enable encapsulation of Ethernet frames in PDCP and SCTP.

Figure 3A:
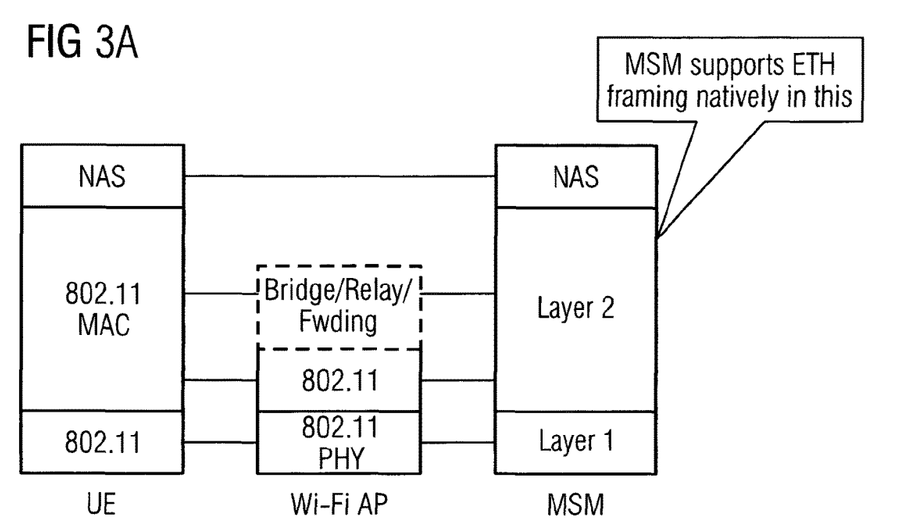
FIG. 3a illustrates an example protocol stack, according to another embodiment.
Figure 3B:
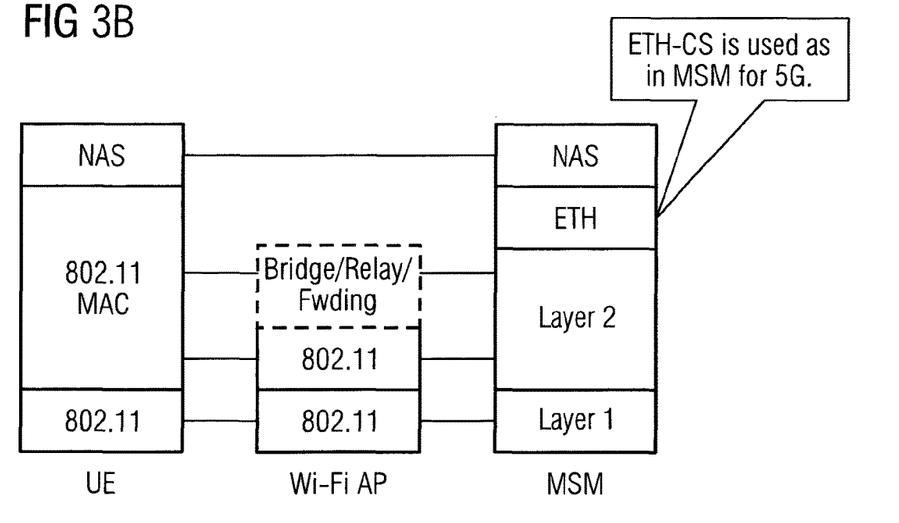
FIG. 3b illustrates an example protocol stack, according to another embodiment.
Figure 3C:
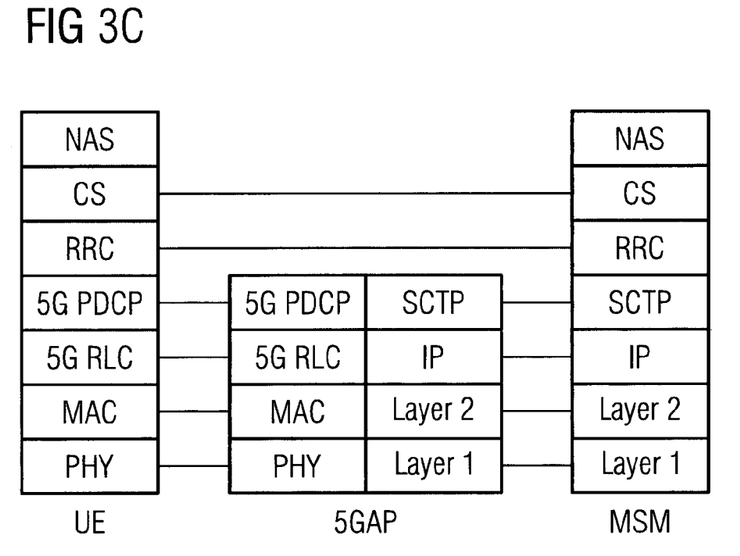
FIG. 3c illustrates an example protocol stack, according to another embodiment.

FIGS. 3a and 3b illustrate example protocol stacks depicting how a NAS message can be transported over other access networks, such as Wi-Fi. It is noted that IEEE 802.11 is using MAC framing (Ethernet) as its native message format. Therefore, in this case, there is no need for a separate ETH-CS layer, as the underlying protocol is Ethernet. If NASoETH is introduced as discussed above in the 5G architecture, then the same NAS message can be transported over Wi-Fi access without changing the Wi-Fi AP. According to an embodiment, in order to transport NAS over ETH, a new ETH Type may be specified. In FIG. 3a NAS protocol data units (higher layer) are encapsulated into Ethernet frames (convergence layer) and are sent as Ethernet frames (lower layer). The NAS protocol is carried natively in Ethernet frames end-to-end. In this case the Ethernet layer as a lower layer natively support Ethernet frames can be considered to be the convergence layer. In FIG. 3b the Ethernet the convergence sublayer is shown for mobility and session management (MSM) being performed by the core network. This shows that the core network can support a common protocol stack both for cellular radio, such as 3GPP (5G), and for Wi-Fi access points. FIG. 3c illustrates an example protocol stack in which the generic convergence layer introduced between NAS and RRC. Generic convergence layer could be IP, ETH or something else. FIG. 3c shows a generic version of a convergence sublayer, and shows that the NAS protocol can be carried over RRC. In other words, a generic convergence sublayer can be used to reach convergence between cellular access and Wi-Fi access even if the cellular access uses RRC as the underlying transport mechanism to transmit NAS messages and for Wi-Fi, a different transport mechanism, for example Ethernet, is used as a transport mechanism.

In an embodiment, local link control (LLC) may be provided as an optional layer between MAC and NAS for Wi-Fi access.

It is noted that standard Ethernet switches may not support fragmentation (max size allowed is 1500 bytes) and, in this case, NAS layer should take care that the message size does not exceed 1500 bytes. However, the Ethernet frame can in principle carry jumbo frames and thus this limitation applies only for standard Ethernet switches and not for the Ethernet protocol as such. In addition, no retransmission is available in the Ethernet layer and therefore NAS layer should take care of re-transmissions.

Figure 4A:
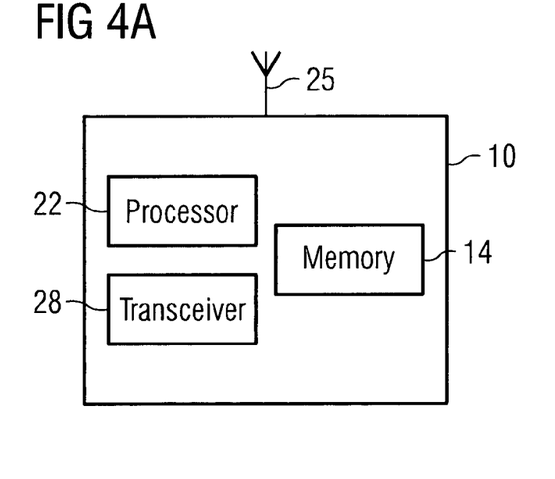
FIG. 4a illustrates a block diagram of an apparatus, according to an embodiment.

FIG. 4a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a Wi-Fi access point, a base station in UMTS, eNB in LTE or LTE-A, or a 5GAP or eNB in a 5G RAT. However, in other embodiments, apparatus 10 may be other components within a radio access network. It should be noted that one of ordinary skill in the art would understand that apparatus 10 may include components or features not shown in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a Wi-Fi access point, base station in UMTS, an eNB in LTE or LTE-A, or a 5GAP or eNB, for example. According to certain embodiments, apparatus 10 may be controlled by memory 14 and processor 22 to receive a NAS message encapsulated in an Ethernet frame from a UE. The NAS message may be an attach request message or tracking area update (TAU) message, for example. In one embodiment, apparatus 10 may then be controlled by memory 14 and processor 22 to select the appropriate mobility and session management entity to forward the NAS message to, based on a selection method or algorithm, for example. According to an embodiment, the selection method may select the appropriate mobility and session management entity based on load, supported features, origin of the UE, device type and applications running in the UE, for example. According to an embodiment, apparatus 10 may also be controlled by memory 14 and processor 22 to forward the NAS message to the selected mobility and session management entity. Thus, apparatus 10 need not consider the ETH addresses for forwarding of frames but forwards transparently ETH frames on a given point-to-point link to the mobility and session management entity.

In another embodiment, apparatus 10 may be configured with an Ethernet bridge/relay/forwarding function. In this embodiment, apparatus 10 does not need to consider other identifiers for forwarding NAS messages, but rather bridges ETH frames according to the bridging specifications for Ethernet with standard protocols.

Figure 4B:
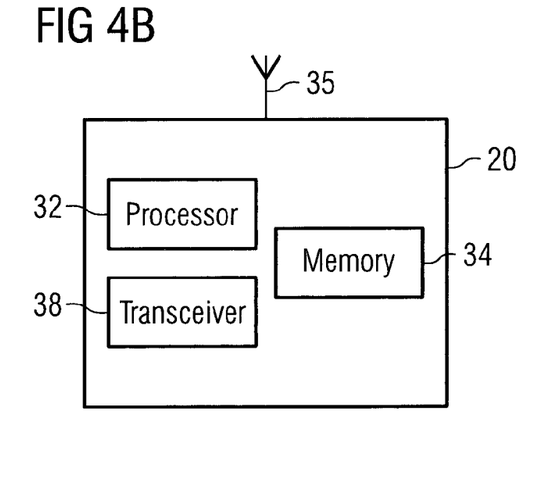
FIG. 4b illustrates a block diagram of an apparatus, according to another embodiment.

FIG. 4b illustrates an example of an apparatus 20 according to another embodiment. In an embodiment, apparatus 20 may be a node or element in a communications network or associated with such a network, such as a mobile device, UE, 5G UE, a machine type UE, or other device. For instance, in some embodiments, apparatus 20 may be 5G UE in a 5G RAT. It should be noted that one of ordinary skill in the art would understand that apparatus 20 may include components or features not shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE or 5G UE. According to an embodiment, apparatus 20 may be controlled by memory 34 and processor 32 to send a NAS message encapsulated in an Ethernet frame to a network node (e.g., 5GAP or eNB). In certain embodiments, the NAS message may be an attach request message or tracking area update (TAU) message, for example. According to some embodiments, the mobility and session management entity may be assigned an ETH multicast address that apparatus 20 can use to send the NAS message to.

In an embodiment, apparatus 20 may be controlled by memory 34 and processor 32 to send the NAS message encapsulated in an Ethernet frame to the ETH multicast address or a broadcast address in the network. In one embodiment, apparatus 20 may be controlled by memory 34 and processor 32 to include its MAC address in the NAS message (as ETH source address).

The network node that receives the NAS message from apparatus 20 may then select the appropriate mobility and session management entity by using a selection method or algorithm (e.g. based on load, supported features, origin of the UE, device type, applications running in the UE, etc.) and forward the NAS message (assumes support for a simple relay in the 5GAP) to the selected mobility and session management entity. Thus, the network node need not consider the ETH addresses for forwarding of frames but forwards transparently ETH frames on a point-to-point link to the mobility and session management entity. In an embodiment, apparatus 20 may be controlled by memory 34 and processor 32 to receive a response from the mobility and session management entity, in which the mobility and session management entity includes its own MAC address as source address in the ETH frame.

Figure 5A:
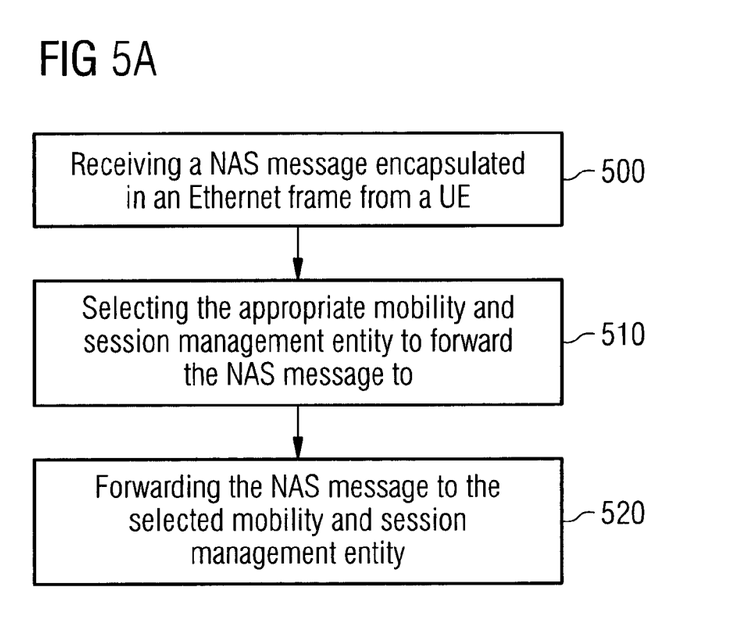
FIG. 5a illustrates a flow diagram of a method, according to one embodiment.

FIG. 5a illustrates an example flow diagram of a method, according to one embodiment. In certain embodiments, the method of FIG. 5a may be performed by a network node, such as a Wi-Fi access point, base station, eNB, or 5GAP in a 5G RAT, for example. As illustrated in FIG. 5a, the method may include, at 500, receiving a NAS message encapsulated in an Ethernet frame from a UE. The NAS message may be an attach request message or tracking area update (TAU) message, for example. In one embodiment, the method may also include, at 510, selecting the appropriate mobility and session management entity to forward the NAS message to, based on a selection method or algorithm, for example. According to an embodiment, the selection method may select the appropriate mobility and session management entity based on load, supported features, origin of the UE, device type, and/or applications running in the UE, for example. According to an embodiment, the method may then include, at 520, forwarding the NAS message to the selected mobility and session management entity.

Figure 5B:
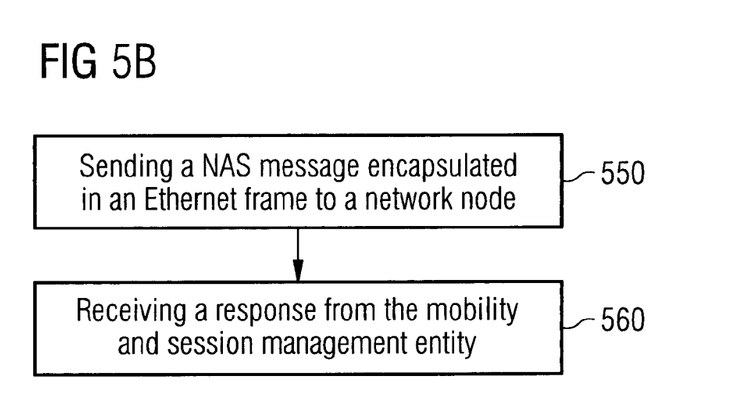
FIG. 5b illustrates a flow diagram of a method, according to another embodiment.

FIG. 5b illustrates an example flow diagram of a method, according to another embodiment of the invention. In certain embodiments, the method of FIG. 5b may be performed by a device, such as a UE in LTE, LTE-A, or 5G. In an embodiment, the method may include, at 550, sending a NAS message encapsulated in an Ethernet frame to a network node (e.g., Wi-Fi AP, eNB or 5GAP). In certain embodiments, the NAS message may be an attach request message or tracking area update (TAU) message, for example. According to some embodiments, the method may include using an ETH multicast address assigned to the mobility and session management entity to send the NAS message to. In an embodiment, the sending step 550 may include sending the NAS message encapsulated in an Ethernet frame to the ETH multicast address or a broadcast address in the network. In one embodiment, the method may include incorporating the MAC address of the UE in the NAS message (as ETH source address).

In some embodiments, the network node that receives the NAS message from the UE may then select the appropriate mobility and session management entity by using a selection method or algorithm (e.g. based on load, supported features, origin of the UE, device type, applications running in the UE, etc.) and forward the NAS message (assumes support for a simple relay in the 5GAP) to the selected mobility and session management entity. Thus, the network node need not consider the ETH addresses for forwarding of frames but forwards transparently ETH frames on a given point-to-point link to the mobility and session management entity. In an embodiment, the method may also include, at 560, receiving a response from the mobility and session management entity, in which the mobility and session management entity includes its own MAC address as source address in the ETH frame.

In view of the above, embodiments of the invention can provide several advantages and technical improvements. These advantages/improvements may include using Ethernet as a transport for NAS enables support of access agnostic control plane protocol between UE and network. For instance, the same NAS message can be sent over Wi-Fi, 5G or LTE radio towards EPC or 5G core. The same MSM protocol stack (L1→L2→ETH→NAS) can be used to carry NAS message over any access (5G or Wi-Fi). This makes the core access independent (a.k.a. access agnostic). Using ETH layer as the transport enables ease in use of addressing capabilities (i.e., devices in the market normally support ETH layer and MAC addressing). If the UE is monitoring 5G cell TAs, and needs to send a TAU to the 5G Mobility Controller, a dual connected UE could send it via Wi-Fi if that required less transmission power, or via both Wi-Fi and 5G. Since RRC is not used for carrying NAS messages, 5G RRC can be designed to be a light weight protocol in terms of message size.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method of control plane messaging between a first entity and a second entity in a network in which control plane messages are sent in a control plane protocol layer wherein a convergence layer is provided below the control plane protocol layer, wherein the convergence layer is an Ethernet layer and the control plane protocol layer is a Non-Access Stratum protocol layer.

2. A method according to claim 1 in which the convergence layer is present between the control plane protocol layer and a radio protocol layer.

3. A method according to claim 1 in which the convergence layer is a convergence sub-layer.

4. A method according to claim 1 in which the convergence layer is an Ethernet layer present as a convergence sublayer between the Non-Access Stratum protocol layer and a radio specific protocol stack.

5. A method according to claim 1 in which Ethernet framing is used to transport Non-Access Stratum messages between a user equipment and a core network.

6. A method according to claim 1 in which the convergence layer resides above a radio resource control layer in a cellular network.

7. A method according to claim 1 in which the convergence layer is a radio protocol layer.

8. A method according to claim 1 in which the convergence layer resides above a media access control layer.

9. A method according to claim 1 in which the convergence layer is an Ethernet layer in a Wi-Fi network.

10. A method according to claim 1 in which the first entity is a user equipment.

11. A method according to claim 1 in which the second entity is network entity in a core network.

12. A method according to claim 1 in which the second entity is a mobility management entity.

13. A method according to claim 1 in which the messaging between the first entity and the second entity is via an access network.

14. A method according to claim 1 in which at least one of an access point and a base station provides bridging for the control plane messages.

15. A user equipment comprising means configured to send control plane messages to a network entity in which control plane messages are sent in a control plane protocol layer wherein a convergence layer is provided below the control plane protocol layer, wherein the convergence layer is an Ethernet layer and the control plane protocol layer is a Non-Access Stratum protocol layer.

16. A network element comprising means configured to send control plane messages to a user equipment in which control plane messages are sent in a control plane protocol layer wherein a convergence layer is provided below the control plane protocol layer, wherein the convergence layer is an Ethernet layer and the control plane protocol layer is a Non-Access Stratum protocol layer.

17. A computer program product comprising a non-transitory computer readable medium encoded with instructions that, when executed in hardware, perform a process, the process comprising performing control plane messaging between a first entity and a second entity in a network in which control plane messages are sent in a control plane protocol layer wherein a convergence layer is provided below the control plane protocol layer, wherein the convergence layer is an Ethernet layer and the control plane protocol layer is a Non-Access Stratum protocol layer.

* * * * *